(12) United States Patent
Maehara (10) Patent No.: US 7,044,275 B2
(45) Date of Patent: May 16, 2006

(54) DRUM BRAKE DEVICE

(75) Inventor: Toshifumi Maehara, Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 0 days.

(21) Appl. No.: 10/866,744

(22) Filed: Jun. 15, 2004

(65) Prior Publication Data

US 2004/0251100 A1 Dec. 16, 2004

(30) Foreign Application Priority Data

Jun. 16, 2003 (JP) .................. P. 2003-170893

(51) Int. Cl.
*F16D 51/00* (2006.01)
(52) U.S. Cl. .................. 188/329; 188/330; 188/79.55
(58) Field of Classification Search ................ 188/324, 188/329, 325, 330, 332, 338, 339, 79.55
See application file for complete search history.

(56) References Cited

U.S. PATENT DOCUMENTS

| 1,876,541 A | * | 9/1932 | Apple | 188/156 |
| 1,922,518 A | * | 8/1933 | Apple | 188/156 |
| 1,949,176 A | * | 2/1934 | Norton | 188/332 |
| 1,968,584 A | * | 7/1934 | Apple | 188/162 |
| 1,968,585 A | * | 7/1934 | Apple | 188/156 |
| 1,968,586 A | * | 7/1934 | Apple | 188/163 |
| 1,968,588 A | * | 7/1934 | Apple | 188/163 |
| 1,968,590 A | * | 7/1934 | Apple | 188/156 |
| 1,983,332 A | * | 12/1934 | Apple | 188/164 |
| 2,051,920 A | * | 8/1936 | Turgot | 188/79.63 |
| 2,375,392 A | * | 5/1945 | Stelzer | 188/332 |
| 2002/0084153 A1 | * | 7/2002 | Maehara | 188/78 |
| 2002/0166742 A1 | * | 11/2002 | Maehara | 188/325 |

FOREIGN PATENT DOCUMENTS

| JP | 2001254766 | * | 9/2001 |
| JP | A-2001-254766 | | 9/2001 |
| JP | 200254665 | * | 2/2002 |
| JP | 2002181087 | * | 6/2002 |
| JP | 2002333042 | * | 11/2002 |

\* cited by examiner

*Primary Examiner*—Devon C. Kramer
(74) *Attorney, Agent, or Firm*—Morgan, Lewis & Bockius LLP (57) ABSTRACT

In a drum brake device having a shoe drive cam, the braking force of which is mechanically controlled according to a reaction force acting on an anchor pin by a brake shoe, the cam plate 76 pivotally supported by the anchor pin 10 and the lever plate 30, to which a shoe operating force is given by the operating force generating means 6, are connected to each other being capable of rotating relatively via a pair of cam pins 21, 23 coming into contact with the brake shoes 3, 4, and the transmitting mechanism of the input system composed of the lever plate 30 and the pair of cam pins 21, 23 and the transmitting mechanism of the control system composed of the pair of cam pins 21, 23 and the cam plate 76 are put into a separate state in which a direct power transmission is not conducted between them.

6 Claims, 5 Drawing Sheets

DRUM BRAKE DEVICE

BACKGROUND OF THE INVENTION

The present invention relates to a drum brake device in which a pushing force of the brake shoe against the brake drum is controlled according to a reaction force so that the brake can be highly effectively applied and stability of the brake can be maintained. More particularly, the present invention relates to improvements in the drum brake device for smoothly transmitting an input of brake at the time of applying the brake.

In order to brake a running vehicle, various types of drum brakes have been conventionally used. These drum brake devices are classified into a leading trailing type drum brake, a two leading type drum brake and a duo-servo type drum brake by the arrangement of brake shoes which are pushed onto the inner circumferential face of the substantially cylindrical drum.

In general, the duo-servo type drum brake device has a pair of brake shoes including a primary shoe and secondary shoe arranged in a cylindrical drum being opposed to each other.

In the primary shoe, the entry side in the forward rotating direction of the drum is an input portion, and the exit side in the forward rotating direction of the drum is connected to an entry side of the secondary shoe, for example, via an adjuster. On the other hand, the exit side of the secondary shoe is made to come into contact with the anchor portion provided on the backing plate, and a reaction force (braking torque) given to the primary and the secondary shoes are received by the anchor portion.

Due to the foregoing, when the primary and the secondary shoe are expanded and pushed onto an inner circumferential face of the brake drum, a reaction force given to the primary shoe is inputted onto the entry side of the secondary shoe, so that the secondary shoe can be pushed onto the inner circumferential face of the brake drum. Therefore, a self-servo action is given to both the primary and the secondary shoe. Accordingly, it is possible to obtain a braking force of a very high gain.

Compared with a leading trailing type and a two leading type drum brake device, the aforementioned duo-servo brake device has the following advantages. It is possible for the duo-servo brake device to provide a very high intensity of braking force. Further, the duo-servo brake device can be easily downsized. Furthermore, a parking brake can be easily incorporated into the duo-servo brake device.

However, the above duo-servo brake device is sensitive to a change in the coefficient of friction of the brake shoe lining. Accordingly, there is a tendency that the braking force is difficult to be stabilized. Therefore, it is necessary to devise to stabilize an intensity of the braking force.

Concerning the recent brake device for vehicle use, in order to provide a brake system having a highly intelligent braking function such as an anti-lock brake system, or in order to cope with an electric vehicle (EV vehicle) which is appropriate to reduce environmental pollution, developing of the electric brake device is a very important task to be accomplished.

According to the background described above, the present applicant has already proposed the following link mechanism to be used as a shoe drive mechanism for expanding brake shoes at the time of applying the brake. At the time of service braking operation, a pair of brake shoes are expanded and pushed against a drum according to a shoe operating force transmitted from the operating force generating means to the input lever. On the other hand, when an intensity of the reaction force given to the anchor pin is increased by a predetermined magnification with respect to an intensity of the shoe operating force, a brake restricting force, which acts in a direction so that an action of the shoe operating force can be reduced, is given to the input lever by the link mechanism. (For example, refer to JP-A-2001-254766.)

When this link mechanism is used, it is possible to stabilize a braking force of the duo-servo type drum brake device. Further, when an electric operating force generating means, into which an electric motor and others are incorporated, is employed as the above operating force generating means instead of a conventional hydraulic wheel cylinder, the electric brake device can be easily realized.

However, in the case of the above conventional link mechanism to be used as a shoe drive mechanism, the following problems may be encountered. In the aforementioned shoe drive mechanism, a reaction force at the time of applying the brake is fed back to an input lever so as to control the braking force. Therefore, the reaction force fed back to the input lever at the time of applying the brake obstructs an input transmission into the brake shoe. Therefore, the input transmission can not be smoothly conducted, and the input transmission efficiency is deteriorated.

SUMMARY OF THE INVENTION

The present invention has been accomplished in view of the above circumstances. It is an object of the present invention to provide a drum brake device wherein a braking force can be controlled according to a reaction force; an effect of the brake can be stably maintained; and the reaction force, which is fed back for controlling the braking force, is not transmitted to an input transmitting means for expanding the brake shoes, so that an input can be smoothly transmitted at the time of applying the brake and the transmitting efficiency can be enhanced.

In order to accomplish the above object, a drum brake device according to the present invention comprises: a first and a second of brake shoes arranged in a drum being opposed to each other; an operating force generator for generating a shoe operating force to push the brake shoes to the drum so as to generate a braking force; and a shoe drive cam, for controlling the braking force by utilizing a reaction force given to the brake shoe at the time of applying the brake, including a first and a second cam pins, wherein each cam pin contacts with an end portion of each brake shoe, a cam plate pivotally supported by an anchor pin perpendicularly arranged on a backing plate, wherein the cam pins are inserted into the cam plate, and wherein gaps are provided between the cam plate and the cam pins; and a lever plate having an input force receiving portion for receiving the shoe operating force, wherein one of the first and the second cam pins is engaged with the lever plate and the other of the first and second cam pins is contact with the lever plate. Further, the brake shoes are opened, via the cam pins, by the rotation of the lever plate according to the shoe operating force, and the cam plate rotates around the anchor pin according to a reaction force given to either of the cam pins in order to control the braking force.

In the drum brake device composed as described above, a braking force is generated as follows. At the time of applying the brake, a pair of cam pins are displaced by the rotating action of the lever plate of the shoe drive cam to which a shoe operating force outputted by the operating force generating means is given, and a braking force is generated by the expansion of the brake shoes, following the displacements of the pair of cam pins.

At the time of applying the brake, a reaction force given to the cam pin by the brake shoe on the output side is transmitted to the cam plate into which the cam pin is inserted. When the cam plate is rotated round the anchor pin by the transmitted reaction force, a restraint made on the brake shoe by the cam pin is released by the displacement of the cam pin following the rotation of the cam plate round the anchor pin. Thus, an increase in the braking force can be suppressed.

The aforementioned shoe drive cam is arranged between the operating force generating means and the brake shoes and mechanically conducts controlling the braking force. Therefore, concerning the operating force generating means, not only the hydraulic type actuator such as a conventional hydraulic wheel cylinder but also the electric actuator such as an electric motor can be used.

In the above shoe driven cam, the cam plate and the lever plate are connected to each other by a pair of cam pins. Further, when a form of the engagement, in which the cam plate and the lever plate are engaged with the cam pins, is devised, it becomes possible to provide a connecting structure in which the cam plate and the lever plate are relatively rotated with each other. When the cam plate and the lever plate are connected to each other being relatively rotated, the transmitting mechanism of the input system composed of the lever plate and the pair of cam pins can be separated from the transmitting mechanism of the control system composed of the pair of cam pins and the cam plate so that power transmission can not be directly conducted between the transmitting mechanism of the input system and the transmitting mechanism of the control system. Accordingly, the reaction force given to the cam plate at the time of applying the brake can not be transmitted to the lever plate.

Note that in the drawings, reference numeral 1 denotes a drum brake device, 3 denotes a primary shoe (Brake shoe: first brake shoe), 4 denotes a secondary shoe (Brake shoe, second brake shoe), 6 denotes an Operating force generating means (Wheel cylinder, operating force generator), 7 denotes a shoe drive cam (Shoe drive mechanism), 8 denotes an adjuster unit, 10 denotes an anchor pin, 21 denotes a primary cam pin (Cam pin: First cam pin), 23 denotes a secondary cam pin (Cam pin: second cam pin), 25 denotes an input pin (input force receiving portion), 30 denotes a lever plate, and 76 denotes a cam plate.

DESCRIPTION OF THE PREFERRED EMBODIMENT

Referring to the drawings, a preferred embodiment of the drum brake device of the present invention will be explained below in detail.

Figure 1:
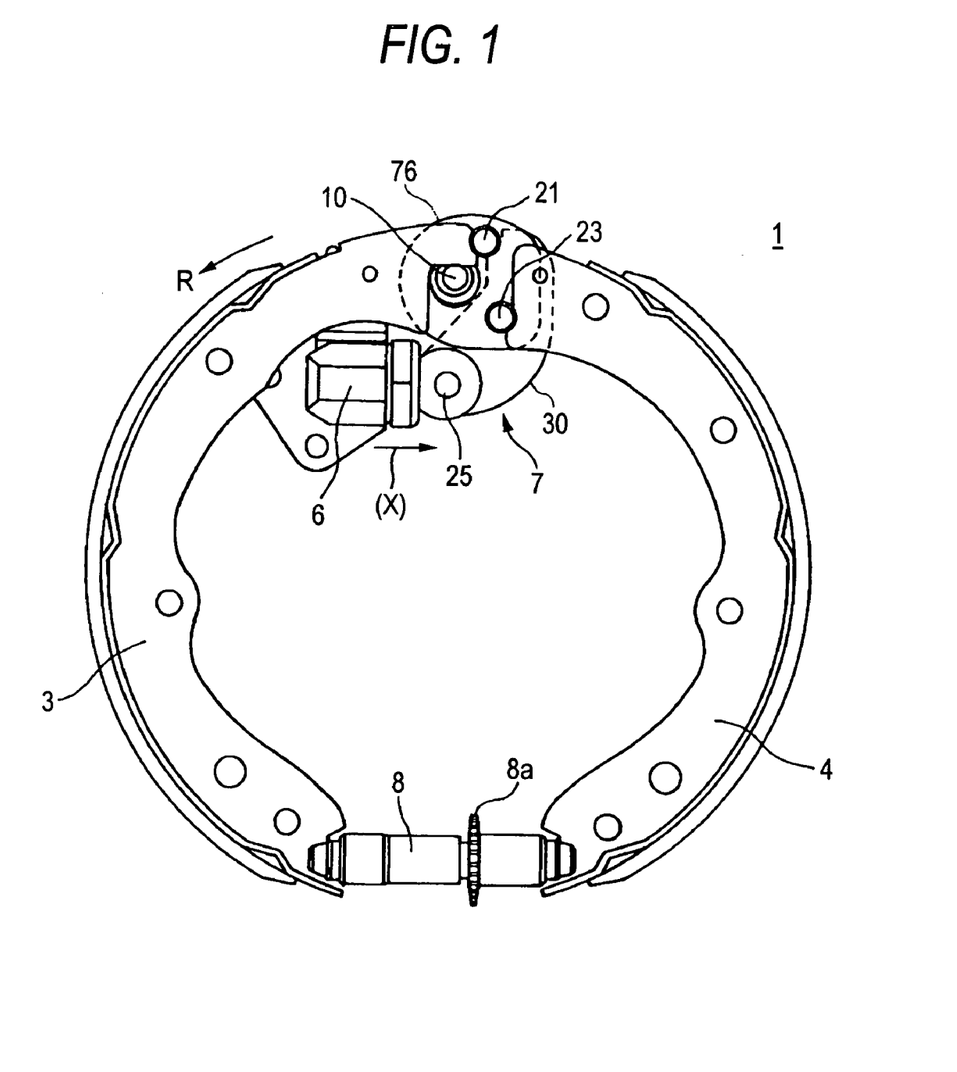
FIG. 1 is a front view showing a primary portion of a preferred embodiment of the drum brake device of the present invention.

FIG. 1 is a front view showing a preferred embodiment of the drum brake of the present invention. The drum brake 1 of this embodiment is what is called a duo-servo type drum brake device. The drum brake 1 includes: a pair of brake shoes 3, 4 composed of a primary shoe 3 and secondary shoe 4 which are arranged being opposed to each other in a space formed in a substantially cylindrical drum not shown in the drawing; an operating force generating means 6 (as a operating force generator) for generating a shoe operating force for pushing the brake shoes 3, 4 against an inner circumferential face of the drum at the time of applying the service brake, the operating force generating means 6 being arranged on one opposing end side of the pair of brake shoes 3, 4; a shoe drive cam 7 that is a shoe drive mechanism for transmitting an operating force generated by the operating force generating means 6 to the brake shoes 3, 4; an adjuster unit 8 that is a link mechanism for inputting an output of the primary shoe 3 into the secondary shoe 4, the adjuster unit 8 being arranged on the other opposing end side of the brake shoes 3, 4; and an anchor pin 10 perpendicularly arranged on the backing plate to support these components.

In this connection, the backing plate and drum are omitted in FIG. 1. Further, the return spring for pushing the brake shoes 3, 4 in a direction so that the shoes 3, 4 can come close to each other is omitted, and the drive mechanism for driving the adjuster unit 8 is also omitted in FIG. 1.

In this connection, the drum not illustrated in the drawing is arranged concentrically with the backing plate. Therefore, when a vehicle is driven forward, the drum is rotated in the direction of arrow R in FIG. 1.

The brake shoes 3, 4 are attached to the backing plate by a shoe hold-down device not shown so that the brake shoes 3, 4 can be moved toward the inner circumference of the drum.

The end portions of the brake shoes 3, 4 on the operating force generating means 6 side are respectively pushed in a direction so that the end portions of the respective shoes can come close to each other (in a direction so that the shoes can be separated from the drum) by a return spring not shown in the drawing.

The end portions of the brake shoes 3, 4 on the adjuster unit 8 side are pushed by a shoe-to-shoe spring not shown so that the end portions of the adjuster unit 8 can be maintained being contacted with the end portions of the brake shoes 3, 4.

In this embodiment, the operating force generating means 6 is a wheel cylinder for outputting a pushing force, which becomes a shoe operating force W (shown in FIG. 7), when an output rod of the cylinder is protruded in the direction of arrow "X" according to the braking operation such as stepping on the brake pedal at the time of applying the service brake.

The adjuster unit 8 is originally provided for the object of adjusting a distance between the end portions of the brake shoes 3, 4 according to the progress of wear of the lining of each brake shoe 3, 4. The adjusting gear 8a is rotated by a rotating action of the adjuster lever which rotates according to displacements of the brake shoes 3, 4, so that the distance between the end portions of the brake shoes 3, 4 can be automatically adjusted.

Figure 6:
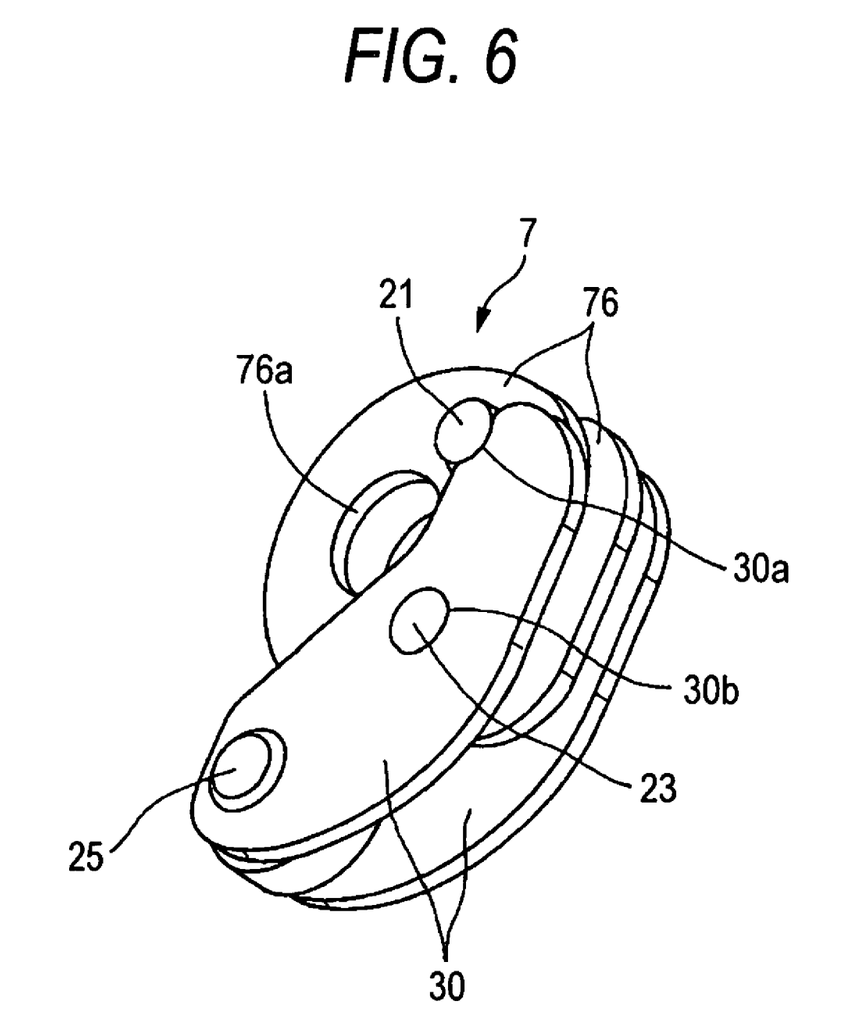
FIG. 6 is a perspective view of the shoe drive cam shown in FIG. 5.

As shown in FIG. 6, the shoe drive cam 7 of this embodiment includes: a pair of lever plates 30; a pair of cam plates 76 arranged between these lever plates 30, 30 being separate from each other, pivotally supported by the anchor pin 10 inserted into the pin engaging hole 76a; a primary pin 21 and secondary pin 23; and an input pin 25, which is an input receiving portion for receiving a shoe operating force W from the operating force generating means 6, pivotally supported between a pair of lever plates 30, 30.

Figure 7:
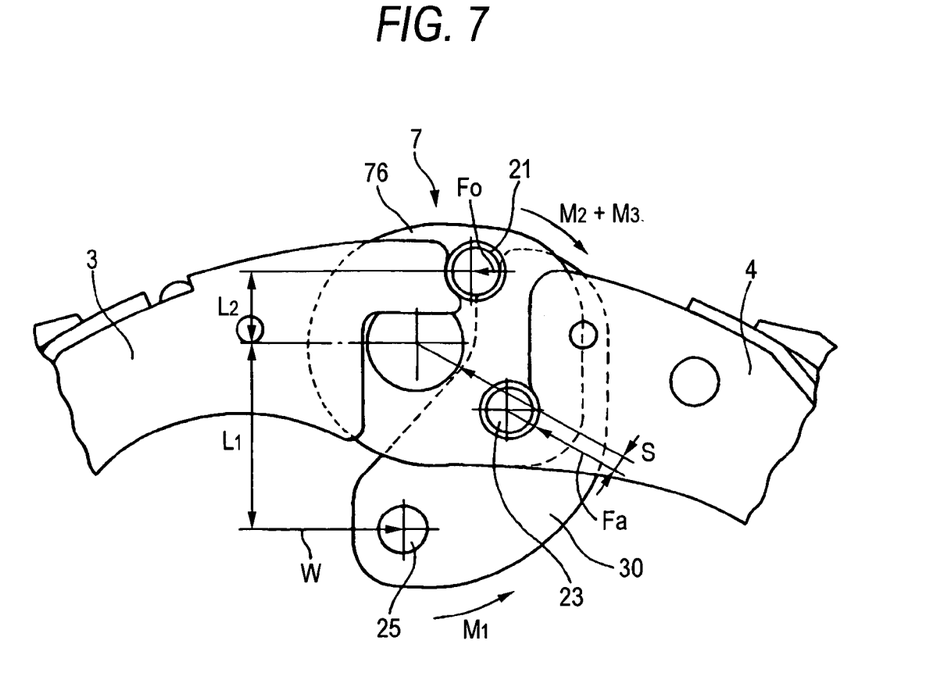
FIG. 7 is a schematic illustration for explaining behavior of the rotation of each cam pin at the time of applying the brake forward of the shoe drive cam shown in FIG. 1.

Concerning the primary pin 21 and the secondary pin 23, as shown in FIGS. 1 and 7, the primary cam pin 21 acts as a shoe engaging cam portion coming into contact with the end portion of the primary shoe 3, and the secondary cam pin 23 acts as a shoe engaging cam portion coming into contact with the end portion of the secondary shoe 4. While the anchor pin 10 is being interposed between the primary cam pin 21 and the secondary cam pin 23, the primary cam pin 21 is arranged at a position outside in the radial direction of the drum, and the secondary cam pin 23 is arranged at a position inside in the radial direction of the drum.

As shown in FIG. 7, the input pin 25 is arranged at a position further inside the radial direction distant from the secondary pin 23.

Figure 2:
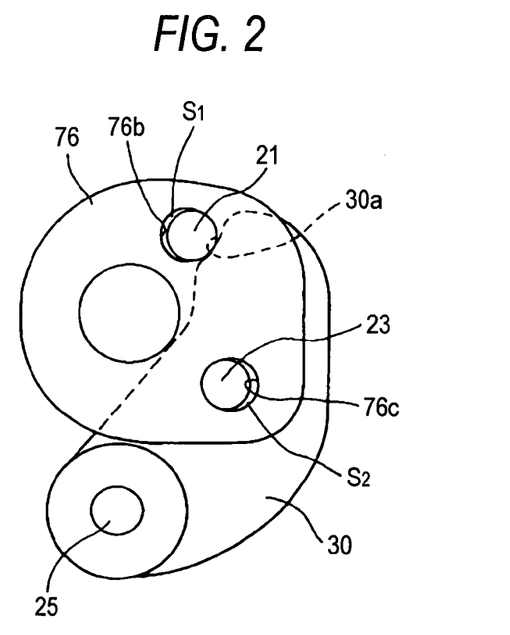
FIG. 2 is a front view showing a state of the drum brake device illustrated in FIG. 1 from which one of the lever plates of the shoe drive cam is removed.
Figure 3:
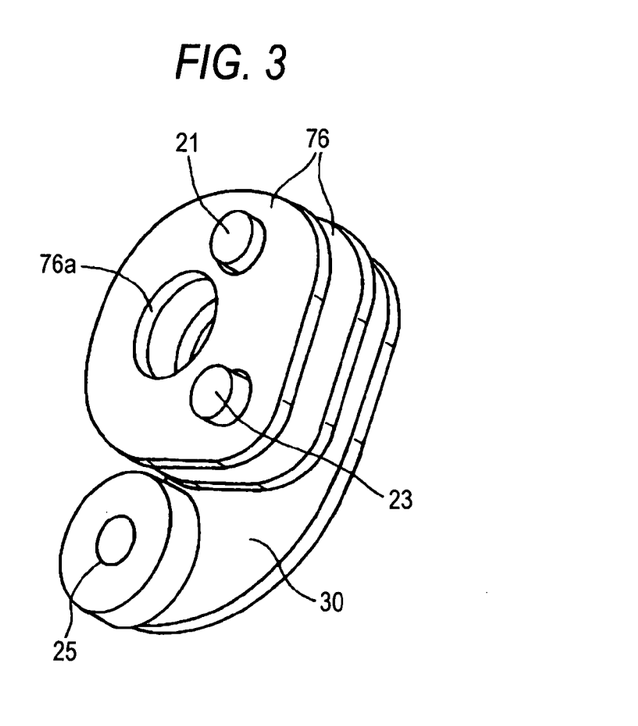
FIG. 3 is a perspective view of the shoe drive cam shown in FIG. 2.
Figure 5:
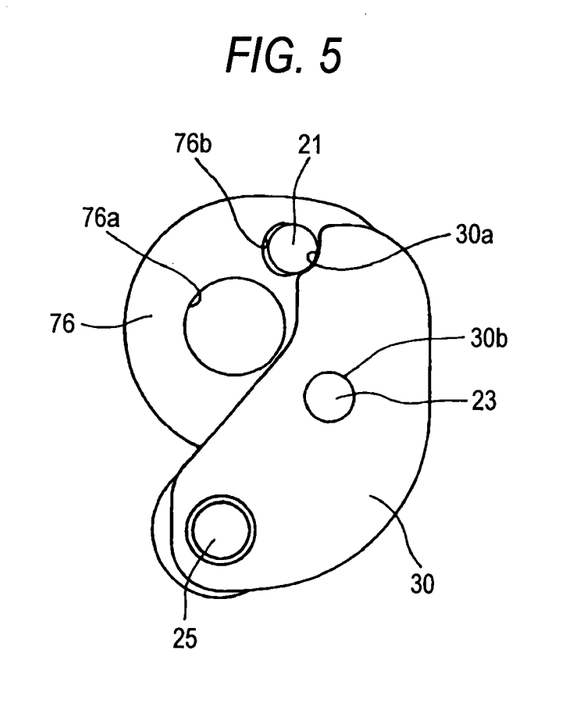
FIG. 5 is a front view of the shoe drive cam shown in FIG. 1 at the time of assembling.

In this embodiment, the cam pins 21, 23 are pivotally inserted into the cam plate 76. As shown in FIGS. 2 and 5, the cam pins 21, 23 are inserted into the pin engaging holes 76b, 76c, the shapes of which have the gaps $\Delta s_1$ and $\Delta s_2$ by which the cam pins 21, 23 can be displaced in the holes, and the cam pins 21, 23 are engaged with the lever plate 30.

Figure 4:
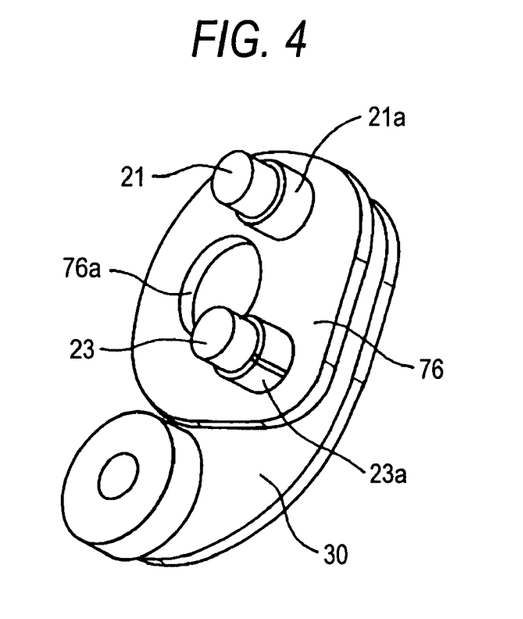
FIG. 4 is a perspective view showing a state of the drum brake device illustrated in FIG. 3 from which one of the cam plates of the shoe drive cam is further removed.

At the time of not applying the brake, as shown in FIG. 2, the cam pins 21, 23 are arranged at non-contact positions at which the outer circumferential face of the pins are separate from the brake shoes 3, 4 by the gaps $\Delta s_1$ and $\Delta s_2$. However, as shown in FIG. 4, the ring bodies 21a, 23a are externally engaged with the cam pins 21, 23 between the pair of cam plates 76, 76. Each brake shoe 3, 4 is arranged between the pair of cam plates 76, 76, so that each brake shoe 3, 4 comes into contact with each cam pin 21, 23 via the ring body 21a, 23a.

Each lever plate 30 is composed of a metallic plate by means of press forming. As described before, a pair of lever plates 30 are arranged on both sides of the cam plate 76.

One end sides of the pair of lever plates 30 are connected to the input pin 25 which receives the shoe operating force W generated by the operating force generating means 6.

Each lever plate 30 includes: a pin engaging portion 30a, the shape of which is a curved convex, contacting with the primary cam pin 21; and a pin engaging portion 30b, the shape of which is a hole-shape, engaging with the secondary cam pin 23.

The pair of pin engaging portions 30a, 30b are respectively engaged with the pair of cam pins 21, 23, so that the lever plate 30 is connected to the cam plate 76 being capable of rotating round either the cam pin 21 or 23.

The cam pins 21, 23 can be displaced on the cam plate 76. By the moving distances of the cam pins 21, 23, the lever plate 30 engaging with the pin engaging portions 30a, 30b can be moved with respect to the cam plate 76.

The shoe drive cam 7 described above operates as follows. For example, at the time of applying the brake when the vehicle advances forward, as shown in FIG. 7, when the input pin 25 receives the shoe operating force W of the operating force generating means 6, the lever plate 30 rotates counterclockwise round the cam pin 21 or cam pin 23. By the displacement of each cam pin 21, 23 caused by the rotation, the brake shoes 3, 4 are expanded so as to generate a braking force. In this way, the lever plate 30 and the cam pins 21, 23 act as a transmitting mechanism of the input system for transmitting the shoe operating force W to the brake shoes 3, 4.

In this connection, when the pair of brake shoes 3, 4 are expanded, the cam plate 76 rotates counterclockwise round the anchor pin 10 while following the displacements of the cam pins 21, 23.

On the other hand, at the time of applying the brake, the reaction force $F_a$ is given onto the cam plate 76 from the brake shoe (the secondary shoe 4 in the case of forward braking, and the primary shoe 3 in the case of backward braking) on the output side via the secondary pin 23 or the primary pin 21. This reaction force $F_a$ causes the angular moment $M_3$ clockwise round the anchor pin 10. Therefore, by the displacements of the pair of cam pins 21, 23 according to the clockwise rotation of the cam plate 76, the braking force is controlled so that it can be reduced. That is, the cam pins 21, 23 and the cam plate 76 act as a transmitting mechanism of the control system for controlling the braking force according to the reaction force $F_a$.

The clockwise rotation of the cam plate 76, which is caused by the reaction force $F_a$ at the time of applying the brake, is very small. The displacements of the pair of cam pins 21, 23, which exceed the gaps $\Delta s_1$ and $\Delta s_2$, caused by the clockwise rotation of the cam plate 76 are also very small.

When the cam plate 76 is rotated clockwise by the reaction force $F_a$, even if the pair of cam pins 21, 23 are displaced, the lever plate 30 can be maintained at the previous positions. Therefore, the transmission of the reaction force $F_a$ from the transmitting mechanism of the control system to the transmitting mechanism of the input system can be avoided.

When a distance between the input pin 25 and the anchor pin 10 in the shoe drive cam 7 is represented by $L_1$ and the shoe operating force inputted from the operating force generating means 6 is represented by W, the angular moment $M_1$ acting counterclockwise on the cam plate 76 by the shoe operating force W is represented as follows.

$$M_1 = W \times L_1 \qquad (1)$$

When a force, by which the primary cam pin 21 pushes the primary shoe 3 to the drum, is represented by $F_0$ and a distance between the anchor pin 10 and the primary cam pin 21 is represented by $L_2$, the angular moment $M_2$ acting on the cam plate 76 by a reaction force of the primary shoe 3 is represented as follows.

$$M_2 = F_0 \times L_2 \qquad (2)$$

At the time of applying the brake forward shown in FIG. 7, when a reaction force acting on the cam plate 76 by the secondary shoe 4 via the secondary cam pin 23 is represented by $F_a$ and a distance between the secondary pin 23 and the anchor pin 10 is represented by s, the angular moment $M_3$ acting clockwise on the cam plate 76 by the reaction force $F_a$ is represented as follows.

$$M_3 = F_a \times s \qquad (3)$$

The shoe drive cam 7 controls the braking force so that the angular moment shown by items (1) to (3) can be balanced.

At the time of applying the brake backward, when the shoe operating force W is transmitted to the input pin 25 from the operation force generating means 6, the lever plate 30 rotates round the cam pin 21 or the cam pin 23 counterclockwise. Due to the movements of the cam pins 21, 23 caused by the rotation of the lever plate 30, the brake shoes 3, 4 are expanded and the braking force is generated.

At the time of applying the brake, a clockwise angular moment acts on the cam plate 76 by the reaction force which acts on the cam pin 21 by the primary shoe. Therefore, in the same manner as that of applying the brake forward, the braking force is controlled. Even at this time of applying the brake backward, the reaction force is not given to the lever plate 30 since the cam pins 21, 23 are displaced on the cam plate 76.

In the drum brake device 1 explained above, at the time of applying the brake, the pair of cam pins 21, 23 are displaced by the rotating action of the lever plate 30 of the shoe drive cam 7 to which the shoe operating force W outputted by the operation force generating means 6 is given. Since the brake shoes 3, 4, which follow the displacements of the pair of cam pins 21, 23, are expanded, the braking force is generated.

At the time of applying the brake, a reaction force acting on the cam pin by the brake shoe on the output side is transmitted to the cam plate 76 supporting the cam pins 21, 23. When the cam plate 76 rotates round the anchor pin by the thus transmitted reaction force, by the displacements of the cam pins 21, 23 caused according to the rotation of the cam plate 76, the restriction of the brake shoes 3, 4 made by the cam pins 21, 23 can be released, and an increase in the braking force is suppressed. Therefore, a stable braking effect can be maintained.

The shoe drive cam 7 described above is arranged between the operating force generating means 6 and the brake shoes 3, 4 and mechanically conducts controlling a braking force. Therefore, concerning the operating force generating means 6, not only the conventional hydraulic type actuator such as a hydraulic wheel cylinder but also the electric actuator such as an electric motor can be used for the brake device. Therefore, by the electric brake device, the braking function can be easily made to be intelligent and further the vehicle can be easily made to be hybrid.

In the above shoe drive cam 7, the cam plate 76 and the lever plate 30 compose a mechanism in which the cam plate 76 and the lever plate 30 are pivotally connected to each other via the pair of cam pins 21, 23.

When the cam plate 76 and the lever plate 30 are connected to each other being capable of rotating relatively, the transmitting mechanism of the input system composed of the lever plate 30 and the pair of cam pins 21, 23 can be separated from the transmitting mechanism of the control system composed of the pair of cam pins 21, 23 and the cam plate 76 so that power transmission can not be directly conducted between the transmitting mechanism of the input system and the transmitting mechanism of the control system. Accordingly, the reaction force given to the cam plate 76 at the time of applying the brake can not be transmitted to the lever plate 30.

Accordingly, the reaction force, which is fed back for controlling the braking force, is not transmitted to the input transmitting means for expanding the brake shoes according to the operating force W. Therefore, at the time of applying the brake, an input can be smoothly transmitted, and the transmitting efficiency of the input can be enhanced.

In this connection, in order to connect the cam plate 76 and the lever plate 30 with each other so that they can be relatively rotated, in this embodiment, as clearly shown in FIGS. 2 and 5, the pin engaging holes 76b, 76c, which are provided on the cam plates 76, 76, with which the cam pins 21, 23 are engaged, are formed into appropriate shapes having the gaps $\Delta s_1$, $\Delta s_2$ so that the cam pins 21, 23 can be displaced in the pin engaging holes 76b, 76c.

However, concerning the structure in which the cam plate 76 and the lever plate 30 are connected to each other being capable of rotating relatively, it is possible to realize a structure composed in such a manner that the cam pins 21, 23 respectively have a shaft portion for the lever engaging with the lever plate 30 being eccentric to the main body shaft portion engaging with the cam plate 76.

As explained above, according to the drum brake device of the present invention, at the time of applying the brake, a pair of cam pins are displaced by the rotating action of the lever plate of the shoe drive cam to which a shoe operating force outputted by the operating force generating means is given, and a braking force is generated when the brake shoes are expanded following the displacements of the pair of cam pins.

At the time of applying the brake, a reaction force acting on the cam pins by the brake shoe on the output side is transmitted to the cam plate supporting the cam pins. When the cam plate is rotated round the anchor pin by the thus transmitted reaction force, the restriction of the brake shoe conducted by the cam pin is released by the displacements of the cam pins, and an increase in the braking force is suppressed. Therefore, a stable braking effect can be maintained.

The shoe drive cam is arranged between the operating force generating means and the brake shoes and mechanically conducts controlling a braking force. Therefore, concerning the operating force generating means, not only the conventional hydraulic type actuator such as a hydraulic wheel cylinder but also the electric actuator such as an electric motor can be used for the brake device. Therefore, by the electric brake device, the braking function can be easily made to be intelligent and further the vehicle can be easily made to be hybrid.

In the shoe drive cam of the present invention, the cam plate and the lever plate compose a mechanism in which the cam plate and the lever plate are pivotally connected to each other via the pair of cam pins.

Since the cam plate and the lever plate are connected to each other being capable of rotating relatively, the transmitting mechanism of the input system composed of the lever plate and the pair of cam pins can be separated from the transmitting mechanism of the control system composed of the pair of cam pins and the cam plate so that power transmission can not be directly conducted between the transmitting mechanism of the input system and the transmitting mechanism of the control system. Accordingly, the reaction force given to the cam plate 76 at the time of applying the brake can not be transmitted to the lever plate.

Accordingly, the reaction force, which is fed back for controlling the braking force, is not transmitted to the input transmitting means for expanding the brake shoes according to the operating force. Therefore, at the time of applying the brake, an input can be smoothly transmitted, and the transmitting efficiency of the input can be enhanced.

What is claimed is:

1. A drum brake device comprising:
    a first and a second of brake shoes arranged in a drum being opposed to each other;
    an operating force generator for generating a shoe operating force to push the brake shoes to the drum so as to generate a braking force; and
    a shoe drive cam, for controlling the braking force by utilizing a reaction force given to the brake shoe at the time of applying the brake, including:
        a first and a second cam pins, wherein each cam pin contacts with an end portion of each brake shoe;

a cam plate pivotally supported by an anchor pin perpendicularly arranged on a backing plate, wherein the cam pins are inserted into the cam plate, and wherein gaps are provided between the cam plate and the cam pins; and a lever plate having an input force receiving portion for receiving the shoe operating force, a first pin engaging portion with a curved convex for contacting with the first cam pin, and a second pin engaging portion with a hole-shape for engaging with the secondary cam pin, wherein the lever plate is connected to the cam plate rotatably around one of the first and second cam pins.

2. The drum brake device according to claim 1, wherein the brake shoes are opened, via the cam pins, by the rotation of the lever plate according to the shoe operating force, and the cam plate rotates around the anchor pin according to a reaction force given to either of the cam pins in order to control the braking force.

3. The drum brake device according to claim 1, wherein the first and the second cam pins are arranged interposing the anchor pin, so that the first cam pin is arranged at a position outside in the radial direction of the drum, and the second cam pin is arranged at a position inside in the radial direction of the drum, and the input force receiving portion is arranged at a position further inside in the radial direction from the secondary pin.

4. The drum brake device according to claim 2, wherein the first and the second cam pins are arranged interposing the anchor pin, so that the first cam pin is arranged at a position outside in the radial direction of the drum, and the second cam pin is arranged at a position inside in the radial direction of the drum, and the input force receiving portion is arranged at a position further inside in the radial direction from the secondary pin.

5. The drum brake device according to claim 1, wherein the cam pins can be displaced on the cam plate.

6. The drum brake device according to claim 2, wherein the cam pins can be displaced on the cam plate.

* * * * *